US011662798B2

(12) United States Patent
Branover et al.

(10) Patent No.: US 11,662,798 B2
(45) Date of Patent: May 30, 2023

(54) TECHNIQUE FOR EXTENDED IDLE DURATION FOR DISPLAY TO IMPROVE POWER CONSUMPTION

(71) Applicants: Advanced Micro Devices, Inc., Santa Clara, CA (US); ATI Technologies ULC, Markham (CA)

(72) Inventors: Alexander J. Branover, Boxborough, MA (US); Christopher T. Weaver, Boxborough, MA (US); Benjamin Tsien, Santa Clara, CA (US); Indrani Paul, Austin, TX (US); Mihir Shaileshbhai Doctor, Santa Clara, CA (US); Thomas J. Gibney, Boxborough, MA (US); John P. Petry, Santa Clara, CA (US); Dennis Au, Markham (CA); Oswin Hall, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/390,479

(22) Filed: Jul. 30, 2021

(65) Prior Publication Data

US 2023/0036191 A1    Feb. 2, 2023

(51) Int. Cl.
*G06F 1/32* (2019.01)
*G06F 1/3234* (2019.01)
*G06F 1/3209* (2019.01)

(52) U.S. Cl.
CPC .......... *G06F 1/3265* (2013.01); *G06F 1/3209* (2013.01); *G06F 1/3275* (2013.01)

(58) Field of Classification Search
CPC ..... G06F 1/3265; G06F 1/3209; G06F 1/3275
USPC ......................................................... 713/320
See application file for complete search history.

(56) References Cited

U.S. PATENT DOCUMENTS

| 8,656,198 | B2* | 2/2014 | Branover ............... G11C 5/148 |
| | | | 713/323 |
| 2007/0109292 | A1* | 5/2007 | Dahan ..................... G09G 5/363 |
| | | | 345/211 |
| 2009/0204831 | A1 | 8/2009 | Cousson et al. |
| 2011/0169848 | A1* | 7/2011 | Bratt ........................ G06T 1/60 |
| | | | 345/545 |
| 2012/0102344 | A1* | 4/2012 | Kocev ................... G06F 1/3287 |
| | | | 713/322 |
| 2013/0185158 | A1* | 7/2013 | Feng ................. H04N 21/4532 |
| | | | 705/14.64 |
| 2014/0292775 | A1 | 10/2014 | Remez et al. |
| 2017/0322614 | A1* | 11/2017 | Holland ................ G06F 1/3287 |
| 2019/0058864 | A1* | 2/2019 | Au ......................... G09G 3/003 |
| 2020/0379510 | A1 | 12/2020 | Aurongzeb et al. |
| 2021/0020224 | A1 | 1/2021 | Cox et al. |

\* cited by examiner

*Primary Examiner* — Chun Cao
(74) *Attorney, Agent, or Firm* — Volpe Koenig (57) ABSTRACT

A disclosed technique includes transmitting data in a first buffer associated with a first display pipe to a first display associated with the first display pipe; transmitting data in a second buffer associated with a second display pipe to the first display; requesting wake-up of a memory; and refilling one or both of the first buffer and the second buffer from the memory.

20 Claims, 5 Drawing Sheets

TECHNIQUE FOR EXTENDED IDLE DURATION FOR DISPLAY TO IMPROVE POWER CONSUMPTION

BACKGROUND

Computing hardware consumes a large amount of power. Mobile devices that rely on batteries to supply this power benefit from power reduction in terms of increased operating duration. Power consumption concerns are thus a perpetual area for improvement for computing hardware.

BRIEF DESCRIPTION OF THE DRAWINGS

A more detailed understanding can be had from the following description, given by way of example in conjunction with the accompanying drawings wherein.

DETAILED DESCRIPTION

A disclosed technique includes transmitting data in a first buffer associated with a first display pipe to a first display associated with the first display pipe; transmitting data in a second buffer associated with a second display pipe to the first display; requesting wake-up of an external memory that is external to the first display pipe and the second display pipe; and refilling one or both of the first buffer and the second buffer from the external memory.

Figure 1:
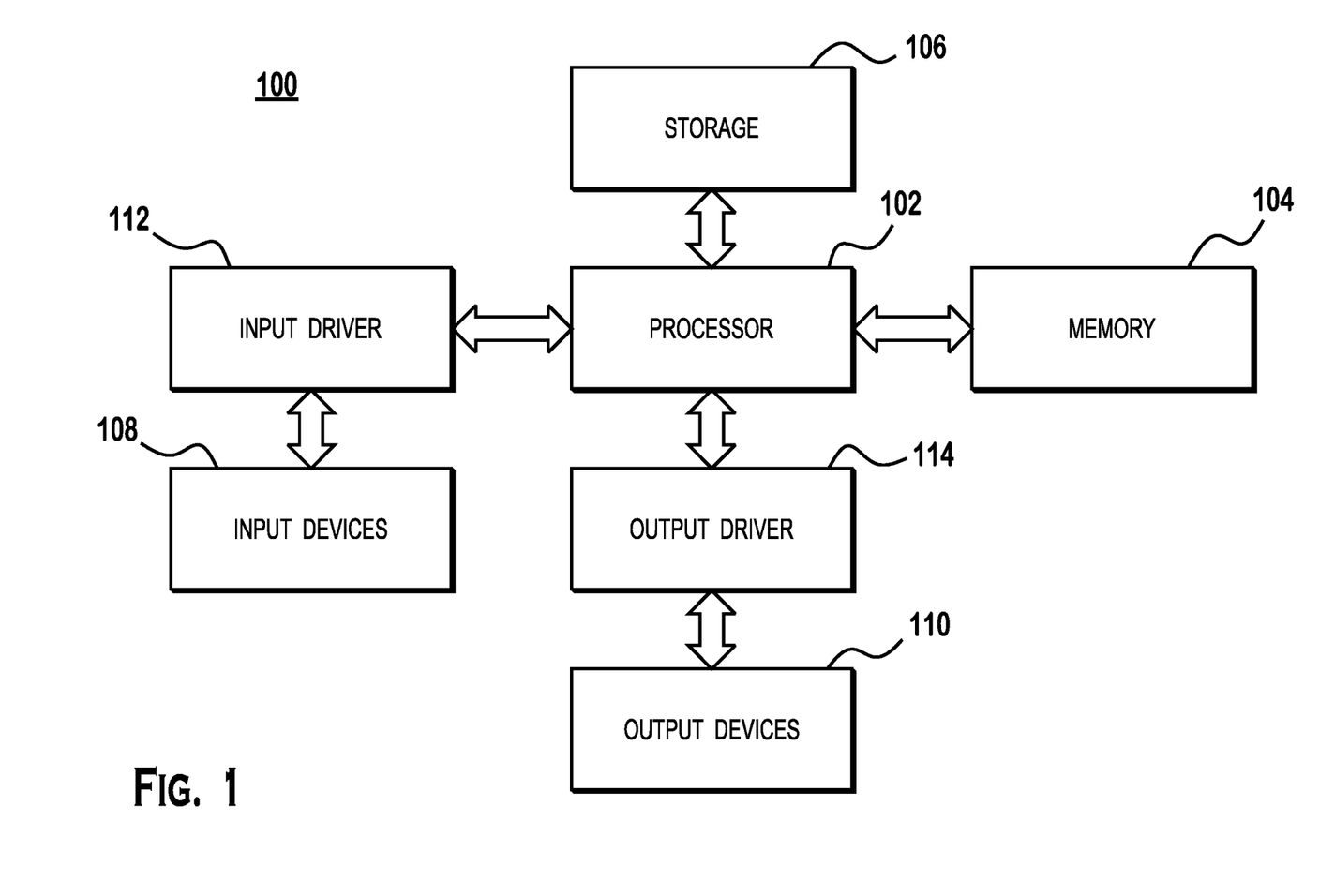
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
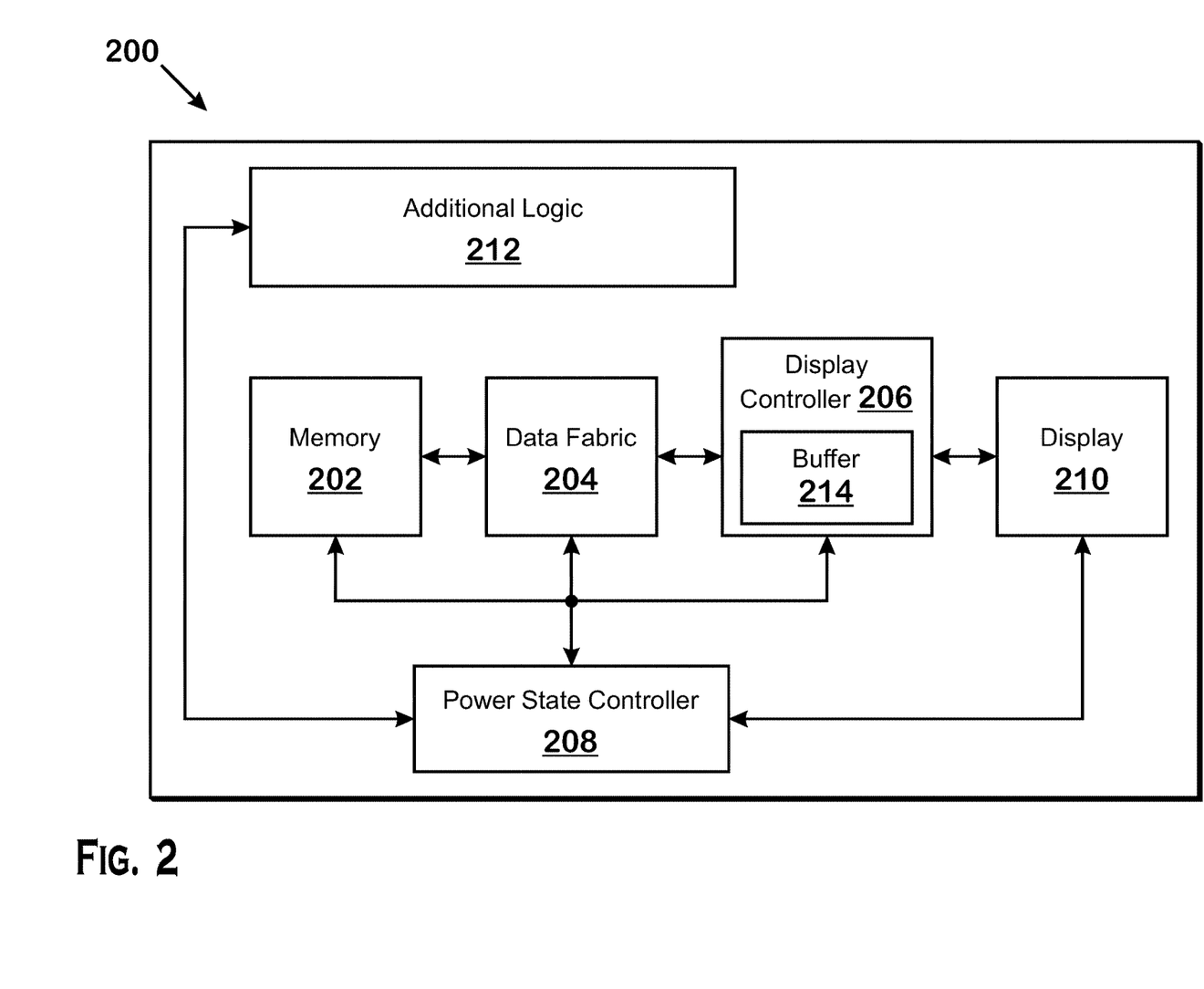
FIG. 2 illustrates a device that is an example implementation of the device of FIG. 1.

FIG. 2 illustrates a device 200 that is an example implementation of the device 100 of FIG. 1. The device 200 includes a memory 202 (which, in some embodiments, is the memory 104 of FIG. 1), a data fabric 204, a display controller 206, and a power state controller 208. The device 200 also includes additional logic 212, such as one or more execution pipelines, cache memories, input/output systems, or other components.

The memory 202 includes one or more memory devices, such as main memory (e.g., memory 104) or other memories. The data fabric 204 is a set of circuits that transfers data between various elements of the device 200, such as between the memory 202 and the display controller 206. The display controller 206 fetches display data such as pixel color values and provides that data to the display 210. The display 210 displays the pixel color values provided by the display controller 206, controlling display circuitry to emit specified colors according to the color values. To display images, the display 210 displays a series of frames. The display controller 206 provides sufficient pixel data for individual frames to be displayed. In some modes of operation, the display controller 206 provides pixel information for all pixels of each frame to the display 210, and the display 210 displays the corresponding pixels. In other modes of operation, the display 210 is capable of performing a self-refresh function, in which the display 210 repeats the contents of a frame one or more times, reducing the need for data transfer from the display controller 206 to the display 210.

The power state controller 208 is capable of controlling the power state of one or more portions of the device 200. Different portions of the device 200 are capable of being set to different power states individually. A power state includes a definition of the degree to which a portion of the device 200 is powered on or off. In some examples, a portion of the device 200 has differing capabilities depending on which power state the device 200 is in. In an example, the display controller 206 is capable of being placed into a first power state in which the display controller 206 is capable of transmitting pixel data to the display 210, and the display controller 206 is also capable of being placed into a second power state in which the display controller 206 is not capable of transmitting pixel data to the display 210. The differing capabilities in differing power states trade capability for power consumption. Specifically, by switching off one or more components of a portion of the device 200, the capabilities associated with that component are disabled, but the power that would normally be used by that component is not expended.

The data fabric 204 and memory 202 are also capable of being powered to a powered-up state or a powered-down state. In the powered-up state, the memory 202 is capable of responding to read or write operations, transmitting data stored therein to a requestor in response to a read request and/or storing data into the memory in response to a write request. In the powered-down state, the memory 202 is not capable of responding to such requests. In the powered-up state, the data fabric 204 is capable of transmitting data between endpoints of the data fabric 204 (such as the memory 202 and the display controller 206). In the powered-down state, the data fabric 204 is not capable of transmitting such data. That different portions of the device 200 are independently switchable into different power states means that any such portion is capable of being in a particular power state (e.g., powered up) while another such portion is capable of being in a different power state (e.g., powered down). Thus, for example, it is possible for the power state controller 208 to be powered up while the data fabric 204 and/or memory 202 are powered down. It is also possible for the display controller 206 to be powered up or down regardless of whether the data fabric 204 and/or memory 202 are powered up or powered down.

The power state controller controls the power states of the different portions of the device 200. In general, the power state controller 208 controls these power states according to inputs from a variety of places, such as hardware units within the device 200 or software modules executing on a processor such as an operating system or driver. In some examples, where the device 200 is sufficiently idle (e.g., no user input has been received recently, and a central processing unit is powered down), the power state controller 208 places the device 200 into a power mode referred to herein as a "display stutter" power mode. In the display stutter power mode, the display controller 206, memory 202, and data fabric 204 are placed into a low power state. One or more portions of the additional logic 212 are optionally also placed into the low power state. The power state controller 208 powers up the display controller 206, memory 202, and data fabric 204 in the situations that those components are needed, as described in further detail herein.

An example sequence of operations for the display stutter power mode is now described. The sequence begins in a state in which the display controller 206 is powered up and the data fabric 204 and memory 202 are powered down. The display controller 206 includes a buffer 214 that stores pixel data for transmission to the display 210. The display controller 206 continues transmitting this data to the display 210 until the amount of data in the buffer 214 is lower than a threshold. In some examples, the threshold is an amount of data that accounts for the latency in powering up the memory 202 and data fabric 204 to refill the buffer 214. Once the amount of data in the buffer 214 is below the threshold, the display controller 206 requests the data fabric 204 and memory 202 to be powered up (e.g., via the power state controller 208). In response, the data fabric 204 and memory 202 power up. The display controller 206 fetches pixel data from the memory 202 and places that pixel data into the buffer 214. After the amount of pixel data in the buffer 214 is above a threshold (e.g., when the buffer 214 is full or at some other high value), the display controller 206 informs the power state controller 208 that the memory 202 and data fabric 204 do not need to be powered up any longer, and the power state controller 208 powers those elements down in response. The display controller 206 continues transmitting pixel data to the display 210 so that the display 210 can continue display frames. In sum, the stutter mode is one in which the display controller 206 transmits display data to the display 210, powering the data fabric 204 and memory 202 on when necessary and off when not needed.

In some examples, the "stutter frequency"—the rate at which the data fabric 204 and memory 202 are powered up and down—is fast relative to the display refresh rate (the frequency with which frames are displayed on the display 210). In an example, the buffer 214 is capable of storing a few display lines and thus must be refilled several times per frame.

Figure 3:
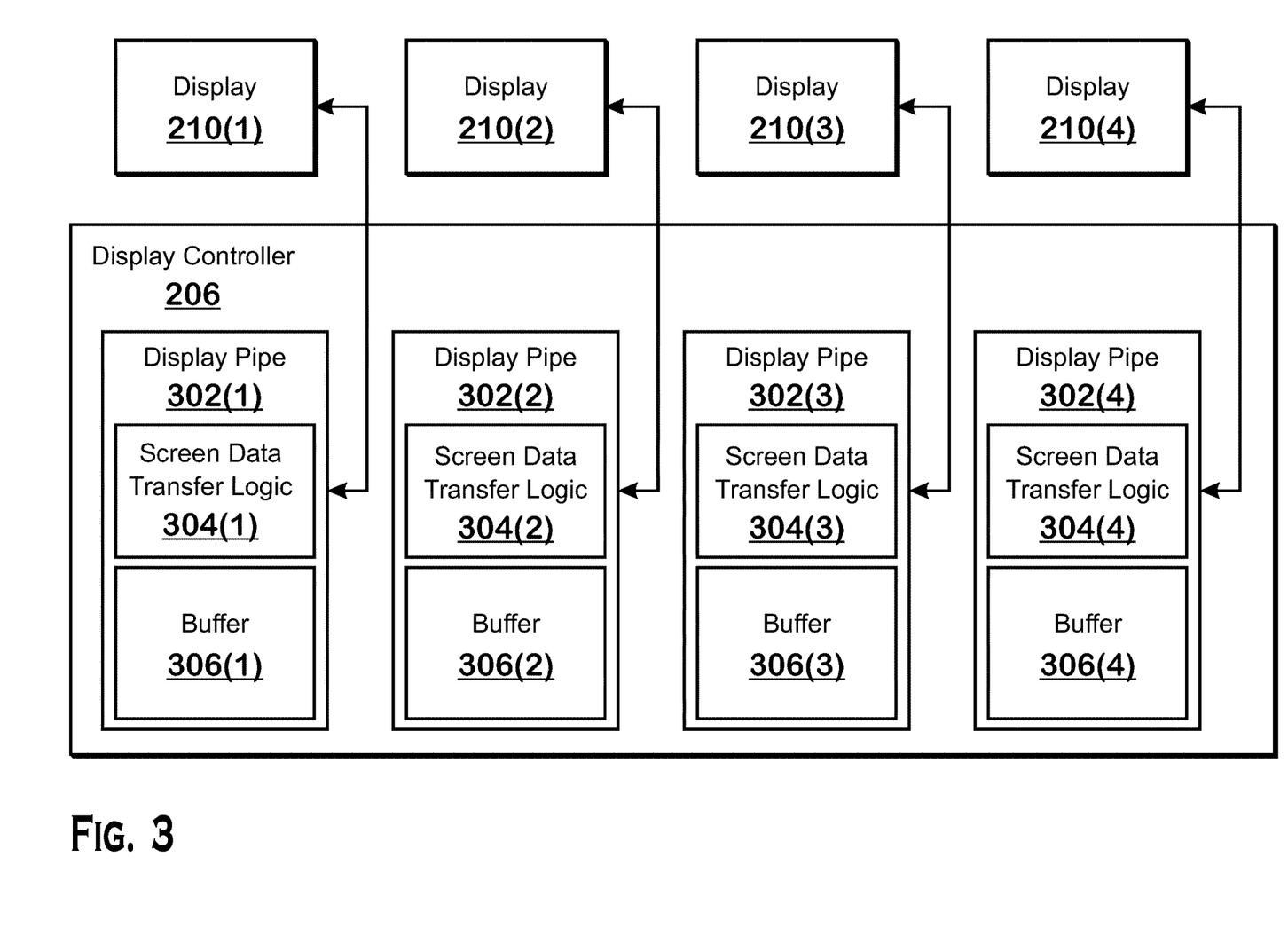
FIG. 3 is a block diagram of the display controller illustrating additional detail.

FIG. 3 is a block diagram of the display controller 206 illustrating additional detail. The display controller 206 includes multiple display pipes 302. Each display pipe 302 includes, without limitation, screen data transfer logic 304 and a buffer 306. The screen data transfer logic 304 transfers data from the buffer 306 to an associated display 210. The buffer 306 stores pixel data for the screen data transfer logic 304 to transmit to the display 210. In some examples, each display pipe 302 is capable of operating in a "stutter mode" as described elsewhere herein, where much of the device 200 is powered down and where the display pipe 302 wakes the data fabric 204 and memory 202 as needed to replenish the buffer 306.

Each display pipe 302 is configured to transmit pixel data to a different display 210 when such a display 210 is connected to the device 200. In one example, an operating system is set up to spread a desktop across four displays 210. Each display pipe 302 provides pixel data for the portion of the desktop appropriate for that display 210. In this mode of operation, the display pipes 302 operate concurrently, each transmitting data to the associated display 210 during the appropriate display period.

Figure 4:
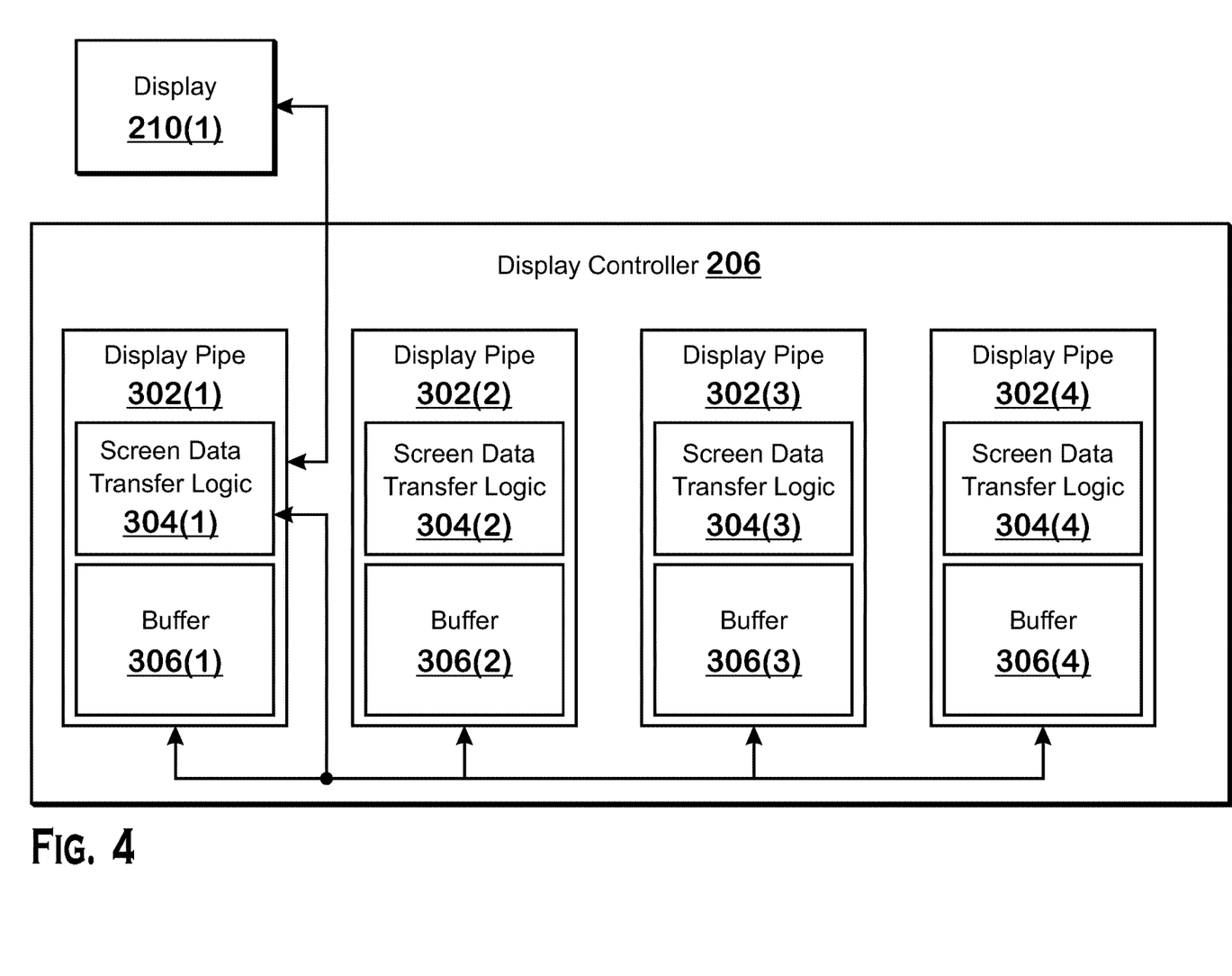
FIG. 4 is a block diagram that illustrates the display controller 206 operating in an expanded buffer mode, according to an example.

FIG. 4 is a block diagram that illustrates the display controller 206 operating in an expanded buffer mode, according to an example. In the expanded buffer mode, one or more display pipes 302 are not providing pixel data to a display 210. In various examples, no display 210 is present for such display pipes 302, or a display 210 is present but disabled, either by software or by hardware.

Because one or more display pipes 302 are not active, the screen data transfer logic 304 associated with those display pipes 302 is not transmitting pixel data for transmission to a display 210 associated with those display pipes 302. Thus the buffers 306 of those display pipes 302 are available for use by the display pipes 302 that are actively transmitting data to a display 210. For this reason, in the mode of operation in which one or more display pipes 302 are inactive, a display pipe 302 that is active uses buffers 306 from more than one display pipe 302 to service a display 210.

More specifically, in this mode of operation, an active display pipe fetches data from the memory 202 via the data fabric 204 into a buffer 306 associated with that display pipe 302 and also into at least one buffer 306 that is associated with a different display pipe 302 that is inactive (not transmitting pixel data to a display 210 associated with that different display pipe 302). The active display pipe 302 transmits data from both the buffer 306 associated with that display pipe 302 and the buffer associated with the inactive display pipe 302 to the display 210. In response to the amount of data in the buffers 306 being below a threshold, the active display pipe 302 fetches additional pixel data from the memory 202 and data fabric 204 and stores that pixel data in the buffers 306.

In some situations, such as where much of the device 200 is powered down and one or more display pipes 302 are inactive, the stutter technique is used with the technique in which one display pipe 302 uses multiple buffers 306. In such a scenario, the active display pipe 302 operates in the following manner. During a time period in which the memory 202 and the data fabric 204 are powered down, the display pipe 302 transmits data from both the buffer 306 associated with that display pipe 302 and the buffer 306 associated with an inactive display pipe 302 to the display 210. In response to the active display pipe 302 detecting that the amount of data in these buffers 306 is less than a threshold, the active display pipe 302 begins a sequence of operations to fetch additional data from the memory 202.

In some examples, detecting that the amount of data in these buffers 306 is less than a threshold includes determining that the amount of data in at least one of the buffers 306 is less than a threshold. In other words, in some examples, the threshold is a per-buffer threshold. In other examples, detecting that the amount of data in these buffers 306 is less than a threshold includes determining that the total amount of data in all buffers 306 that the active display pipe 302 is using to transmit pixel data to the display 210 is less than a threshold. In other words, in some examples, the threshold is a total threshold, rather than a per-buffer threshold.

The sequence of operations to fetch additional data from the memory 202 includes the active display pipe 302 requesting that the memory 202 and data fabric 204 be woken up. In some examples, the active display pipe 302 requests the power state controller 208 to power up the memory 202 and data fabric 204. In response to these requests, the memory 202 and data fabric 204 power up, changing from a low power state in which the memory 202 and data fabric 204 are not able to service read requests from the active display pipe 302 to a higher power state in which the memory 202 and data fabric 204 are able to service read requests from the active display pipe 302.

Once the memory 202 and data fabric 204 are woken up, the active display pipe 302 reads additional data from the memory 202 and places that additional data into one or more of the buffers 306 as needed. When the one or more buffers 306 are considered sufficiently full, the active display pipe 302 informs the power state controller 208 that the memory 202 and data fabric 204 no longer need to be powered on for the purposes of the active display pipe 302. In response, the power state controller 208 powers down the memory 202 and the data fabric 204 in the event that those elements are not needed to be powered up for any other purpose. In the event that the memory 202 and data fabric 204 are needed for purposes other than the active display pipe 302, the power state controller 208 does not power those elements down. The active display pipe 302 continues reading pixel data from the one or more buffers 306 and transmitting that data to the display 210 during the above activities.

In some examples, the device 200 switches between a mode in which a display pipe 302 accesses only one buffer 306 (i.e., the buffer 306 associated with that display pipe 302) and a mode in which the display pipe 302 accesses multiple buffers 306, in transmitting data to one or more displays 210. In some such examples, the device 200 is operating in a mode in which each display pipe 302 is coupled to a different display 210 and is actively transmitting pixel data to the coupled display. Subsequently, one or more of the displays 210 stops needing data from a display pipe 302, due to, for example, becoming disconnected or powered down. In response to the one or more displays 210 no longer needing data, one of the display pipes 302 coupled to a display 210 that still needs pixel data begins utilizing at least one additional buffer 306 for transmitting data to the associated display 210. For example, in response to a first display 210 coupled to a first display pipe 302 being powered down or disconnected from the device 200, a first display pipe 302 providing pixel data to that first display 210 stops providing pixel data to that first display 210. A second display pipe 302 still coupled to and providing pixel data to a second display 210 utilizes the buffer 306 of the first display pipe 302, in addition to the buffer 306 of the second display pipe 302, to provide pixel data to the second display 210. In some examples, after the first display pipe 302 again begins providing pixel data to the first display 210, the second display pipe 302 no longer uses the buffer 306 of the second display pipe 302 to provide data to the second display 210.

In some modes of operation, the device 200 is not operating more than one display 210. In such situations, the device does not alternate between a mode in which a buffer 306 is used by one display pipe 302 and a mode in which the buffer 306 is used by a different display pipe 302. However, in such situations, the display controller 206 contains buffers 206 for multiple display pipes 302. Although each such display pipe 302 is capable of transmitting data to an individual display 210, only one such display pipe 302 is active. In such situations, that display pipe 302 uses the buffers 206 of each of the display pipes to transmit pixel data to the display 210. In some modes of operation, multiple displays 210 are coupled to the device 200 and are active, and thus some display pipes 302 are actively providing data to those displays 210. However, not every display pipe 302 is active because the number of displays 210 active and coupled to the device 200 is smaller than the number of displays 210 supported by the device 200. In such situations, at least one of the active display pipes 302 uses at least one of the buffers 306 of the inactive display pipes 302.

The device 200 is capable of switching between any of the modes of operation described elsewhere herein. For example, the device 200 is capable of switching between a mode of operation in which a single display 210 is coupled to the device 200 and one display pipe 302 is using all buffers 206 to transmit data to the single display 210, and a mode of operation in which multiple displays 210 are coupled to the device 200 and all display pipes 302 use only their buffer 206 and not other buffers 206 to transmit pixel data to the coupled display 210. In addition, the device 200 is capable of switching between various modes in which different numbers of displays 210 are coupled and the associated display pipes 302 are actively transmitting to those displays 210. A display hot-plug event can trigger a change in the buffer 306 allocation.

One benefit of allowing a display pipe 302 to use buffers 306 of other display pipes 302 is that the display pipe 302 does not need to wake up the memory and data fabric 204 as often as if fewer buffers 306 were used. By reducing the amount of time these elements are powered up and also reducing the number of times these elements are switched between being powered up and powered down, an overall power reduction is achieved. In FIG. 4, display pipe 302(2), display pipe 302(3), and display pipe 302(4) are not providing data to any display 210. Display pipe 302(1) is thus able to use all of the buffers 306 of the display pipes 302 to transmit data to the display 210. In the event that the technique disclosed herein is combined with a pixel compression technique, the amount of data available for a display pipe 302 is increased even further, thus further reducing the amount of time that the memory and data fabric 204 are woken up.

Figure 5:
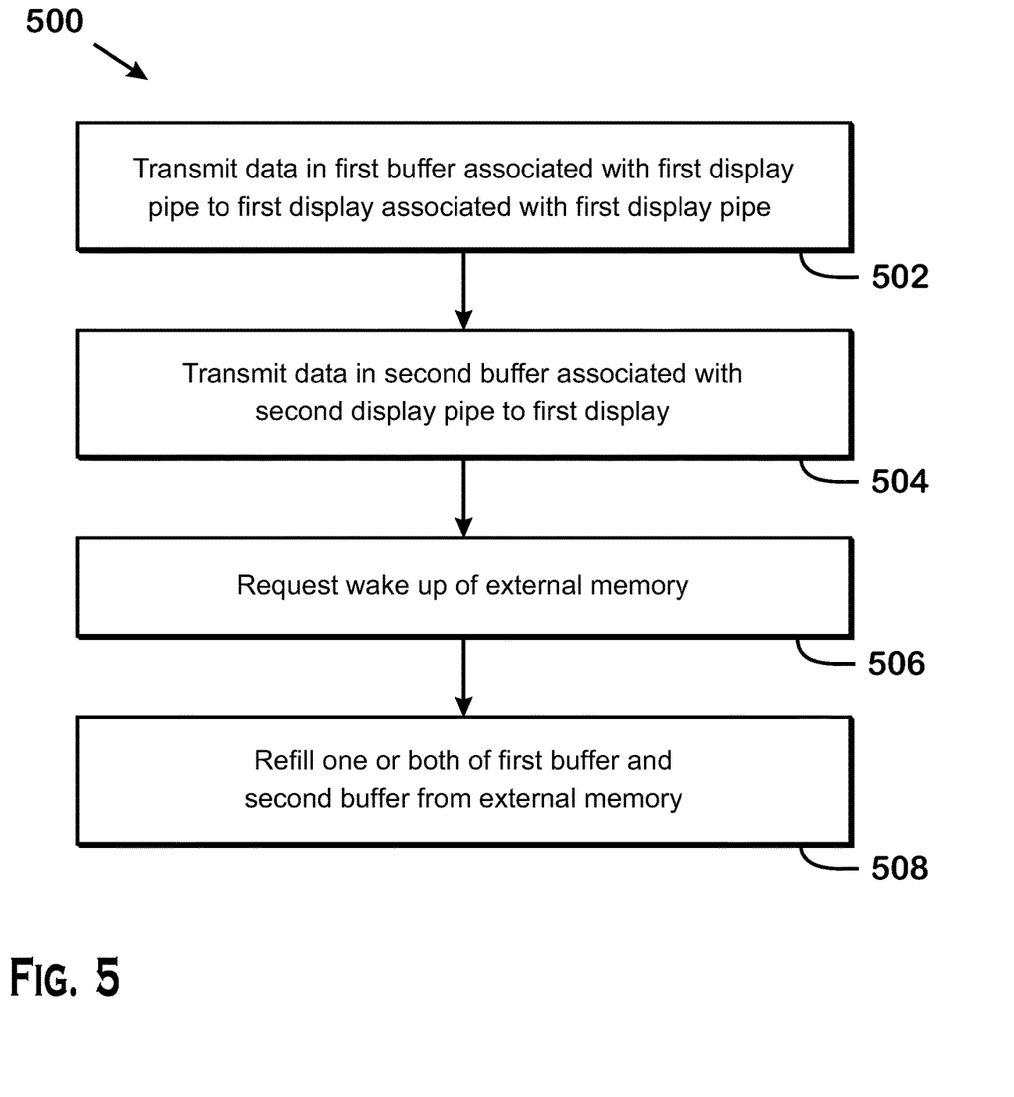
FIG. 5 is a flow diagram of a method for operating a display controller, according to an example.

FIG. 5 is a flow diagram of a method 500 for operating a display controller, according to an example. Although described with respect to the system of FIGS. 1-4, those of skill in the art will understand that any system, configured to perform the steps of the method 500 in any technically feasible order, falls within the scope of the present disclosure. The method 500 is described in the context of a system that includes at least two displays.

The method 500 begins at step 502, where a display controller 206 transmits data in a first buffer to a first display that is coupled to the display controller 206. The first buffer is a buffer 306 that is associated with a first display pipe 302, which is a portion of the display controller 206. The first display pipe 302 is a display pipe that transmits data to a display through an output coupled to the first display pipe 302 when such a display exists and is active. This "output" is a port coupled to the display pipe 302 that can be coupled to a display. Each display pipe 302 has such an output for connection to a respective display 210. The "association" between the buffer 306 and the first display pipe 302 means that, in a mode of operation in which the display controller 206 is driving the maximum number of displays 210 (the "max-displays mode") that can be driven by the display controller 206, the first buffer is the buffer from which data is transmitted to the display associated with the first display pipe 302. The buffers 306 within the display pipes 302 in FIG. 4 are buffers 306 associated with those display pipes 302.

At step 504, the display controller 206 transmits pixel data from a second buffer 306 that is associated with a second display pipe 302 to the first display 210. The second buffer 306 and second display pipe 302 are used to transmit data to a display coupled to the display pipe 302 when such a display is present and enabled, but at step 504, such a display is not present or enabled. Thus the first display pipe 302 is able to use the second buffer 306 to transmit data to the first display 210.

At step 506, the display controller 206 requests wake up of an external memory. In some examples, the external memory is the memory 202, which is a general purpose of the device 200. In some examples, the display controller 206 also requests wake up of the data fabric 204, which communicatively couples the memory 202 to the display controller 206. In some examples, a different element, such as the power state controller 208 or a different element, initiates wake-up of the memory 202, instead of the display controller 206.

At step 508, the display controller 206 fetches data from the memory 202 and refills one or both of the first buffer 306 and the second buffer 306. The data used to refill these buffers is additional data for transmission to the display 210, such as additional pixels for the current frame or for a subsequent frame. In some situations, after this refill, the display controller 206 or other element requests that the memory 202 and/or data fabric 204 be returned to a powered-down state. In some examples, the power state controller 208 returns these elements to the powered-down state in the event that these elements are not needed for a different element of the device 200.

It should be understood that many variations are possible based on the disclosure herein. Although features and elements are described above in particular combinations, each feature or element can be used alone without the other features and elements or in various combinations with or without other features and elements. In an example, although display pipes 302 are shown with similar components, it is possible for one or more display pipes 302 to include components not included in other display pipes 302. In an example, one or more display pipes includes components capable of filling its own buffer 306 and the buffer 306 of one or more other display pipes 302 from memory. In another example, one or more display pipes 302 includes components capable of requesting wake-up of the external memory in order to refill one or more buffers 306. In another example, the buffers 306 for all display pipes are a single buffer that is divided between the display pipes 302. In such an example, the buffer is proportionally divided between active display pipes 302 (where active display pipes are display pipes 302 that are providing pixel data to a display).

The various functional units illustrated in the figures and/or described herein (including, but not limited to, the processor 102, the input driver 112, the input devices 108, the output driver 114, the output devices 110, the data fabric 204, the display controller 206, the power state controller 208, the additional logic 212, the display pipes 302, and the screen data transfer logic 304) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
    transmitting data in a first buffer associated with a first display pipe to a first display associated with the first display pipe;
    transmitting data in a second buffer associated with a second display pipe to the first display;
    requesting wake-up of a memory; and
    refilling one or both of the first buffer and the second buffer from the memory.

2. The method of claim 1, further comprising:
    after refilling the one or both of the first buffer and the second buffer, requesting the memory be powered down.

3. The method of claim 1, further comprising:
    in addition to requesting wake-up of the memory, waking up a data fabric.

4. The method of claim 3, further comprising:
after refilling the one or both of the first buffer and the second buffer, requesting the data fabric be powered down.

5. The method of claim 1, wherein requesting wake-up of the memory is done in response to an amount of pixel data in one or both of the first buffer or the second buffer being below a threshold.

6. The method of claim 1, further comprising switching operation to a dual pipe mode of operation that includes:
transmitting data via the first display pipe from the first buffer to the first display; and
transmitting data via the second display pipe from the second buffer to a second display.

7. The method of claim 6, further comprising:
in the dual pipe mode of operation, operating in a mode in which each display pipe transmits data from a respective buffer to an associated display.

8. The method of claim 6, further comprising:
entering into the dual pipe mode of operation in response to detecting connection or enablement of the second display.

9. The method of claim 8, further comprising:
entering into a single display mode in which the first display pipe transmits data from the first buffer and the second buffer to the first display.

10. A display system, comprising:
a display controller;
a first display pipe of the display controller, the first display pipe including a first buffer; and
a second display pipe of the display controller, the second display pipe including a second buffer,
wherein the display controller is configured to:
transmit data in the first buffer to a first display associated with the first display pipe;
transmit data in the second buffer to the first display;
request wake-up of a memory; and
refill one or both of the first buffer and the second buffer from the memory.

11. The display system of claim 10, wherein the display controller is further configured to:
after refilling the one or both of the first buffer and the second buffer, request the memory be powered down.

12. The display system of claim 10, wherein the display controller is further configured to:
in addition to requesting wake-up of the memory, wake up a data fabric.

13. The display system of claim 12, wherein the display controller is further configured to:
after refilling the one or both of the first buffer and the second buffer, request the data fabric be powered down.

14. The display system of claim 10, wherein requesting wake-up of the memory is done in response to an amount of pixel data in one or both of the first buffer or the second buffer being below a threshold.

15. The display system of claim 10, wherein the display controller is further configured to switch operation to a dual pipe mode of operation that includes:
transmitting data via the first display pipe from the first buffer to the first display; and
transmitting data via the second display pipe from the second buffer to a second display.

16. The display system of claim 15, wherein the display controller is further configured to:
in the dual pipe mode of operation, operate in a mode in which each display pipe transmits data from a respective buffer to an associated display.

17. The display system of claim 15, wherein the display controller is further configured to:
enter into the dual pipe mode of operation in response to detecting connection or enablement of the second display.

18. The display system of claim 17, wherein the display controller is further configured to:
enter into a single display mode in which the first display pipe transmits data from the first buffer and the second buffer to the first display.

19. A display system, comprising:
a first display;
a display controller;
a first display pipe of the display controller, the first display pipe including a first buffer; and
a second display pipe of the display controller, the second display pipe including a second buffer,
wherein the display controller is configured to:
transmit data in the first buffer to the first display associated with the first display pipe;
transmit data in the second buffer to the first display;
request wake-up of a memory; and
refill one or both of the first buffer and the second buffer from the memory.

20. The display system of claim 19, wherein the display controller is further configured to:
after refilling the one or both of the first buffer and the second buffer, request the memory be powered down.

* * * * *